(12) United States Patent
Wang et al.

(10) Patent No.: US 10,451,797 B2
(45) Date of Patent: Oct. 22, 2019

(54) FEW-MODE OPTICAL FIBER

(71) Applicants: STATE GRID JIANGXI ELECTRIC POWER COMPANY INFORMATION & TELECOMMUNICATION BRANCH, Jiangxi (CN); STATE GRID CORPORATION OF CHINA, Beijing (CN); JIANGSU UNIVERSITY, Jiangsu (CN)

(72) Inventors: Hua Wang, Jiangxi (CN); Mingyang Chen, Jiangsu (CN); Xiaosheng Wu, Jiangxi (CN); Renhua Li, Jiangxi (CN); Zhimin Cai, Jiangxi (CN); Guodong Cao, Jiangxi (CN); Shenyi Li, Jiangxi (CN); Luming Li, Jiangxi (CN); Jihai Yang, Jiangxi (CN); Pingping Fu, Jiangxi (CN); Meilan Zheng, Jiangxi (CN); Hui Xiao, Jiangxi (CN); Hongliang Chu, Jiangxi (CN); Jun Li, Jiangxi (CN); Fang Yin, Jiangxi (CN)

(73) Assignees: STATE GRID JIANGXI ELECTRIC POWER COMPANY INFORMATION & TELECOMMUNICATION BRANCH (CN); STATE GRID CORPORATION OF CHINA (CN); JANGSU UNIVERSITY (CN)

( * ) Notice: Subject to any disclaimer, the term of this patent is extended or adjusted under 35 U.S.C. 154(b) by 0 days.

(21) Appl. No.: 16/321,844

(22) PCT Filed: Dec. 18, 2017

(86) PCT No.: PCT/CN2017/117050
§ 371 (c)(1),
(2) Date: Jan. 30, 2019

(87) PCT Pub. No.: WO2018/072763
PCT Pub. Date: Apr. 26, 2018

(65) Prior Publication Data
US 2019/0162899 A1    May 30, 2019

(30) Foreign Application Priority Data

Oct. 18, 2016 (CN) .......................... 2016 1 0907794

(51) Int. Cl.
*G02B 6/036* (2006.01)
*G02B 6/02* (2006.01)

(52) U.S. Cl.
CPC ..... *G02B 6/03688* (2013.01); *G02B 6/02019* (2013.01); *G02B 6/02261* (2013.01); *G02B 6/03644* (2013.01); *G02B 6/03694* (2013.01)

(58) Field of Classification Search
CPC ............ G02B 6/02019; G02B 6/02261; G02B 6/03644; G02B 6/03694
See application file for complete search history.

(56) References Cited

U.S. PATENT DOCUMENTS 4,715,679 A * 12/1987 Bhagavatula ...... G02B 6/02238
                                                   385/124
6,326,416 B1 * 12/2001 Chien .................. C03C 25/106
                                                   522/91

(Continued)

FOREIGN PATENT DOCUMENTS

| CN | 104698534 A | 6/2015 |
|---|---|---|
| CN | 104793285 A | 7/2015 |
| CN | 106597603 A | 4/2017 |

OTHER PUBLICATIONS

International Search Report dated Apr. 30, 2018; International Patent Application No. PCT/CN2017/117050 filed Dec. 18, 2017. ISA/CN.

(Continued)

*Primary Examiner* — Sung H Pak
(74) *Attorney, Agent, or Firm* — McDonald Hopkins LLC

(57) ABSTRACT

Provided is a few-mode optical fiber. The optical fiber includes: a core and a cladding enclosing the core. The (Continued)

cladding includes: a first inner cladding surrounding the core; a first high-refractive-index mode filter layer surrounding the first inner cladding; a second inner cladding surrounding the first high-refractive-index mode filter layer; a second high-refractive-index mode filter layer surrounding the second inner cladding; and an outer cladding surrounding the second high-refractive-index mode filter layer.

10 Claims, 3 Drawing Sheets

(56) References Cited

U.S. PATENT DOCUMENTS

| | | | | |
|---|---|---|---|---|
| 7,929,818 | B1* | 4/2011 | Bickham | G02B 6/02019 |
| | | | | 385/124 |
| 8,971,682 | B2* | 3/2015 | Evans | G02B 6/0288 |
| | | | | 385/11 |
| 9,857,529 | B2* | 1/2018 | Wood | G02B 6/268 |
| 2002/0164140 | A1 | 11/2002 | Lysiansky et al. | |
| 2012/0262781 | A1* | 10/2012 | Price | G02B 6/14 |
| | | | | 359/341.3 |

OTHER PUBLICATIONS

Patent Cooperation Treaty (PCT), International Search Report and Written Opinion for Application PCT/CN2017/117050 filed Dec. 18, 2017, dated Apr. 3, 2018, International Searching Authority, CN.

* cited by examiner

FEW-MODE OPTICAL FIBER

CROSS-REFERENCE TO RELATED APPLICATION

This application is a 35 U.S.C. 371 national stage filing of PCT Application No. PCT/CN2017/117050 filed on Dec. 18, 2017, which claims priority to Chinese Patent Application No. 201610907794.9 filed on Oct. 18, 2016, each of which are incorporated herein in their entirety by reference.

TECHNICAL FIELD

The present disclosure relates to the field of optical fiber communication, and for example to a few-mode optical fiber capable of a single-mode operation and characterized by a low bending loss in the fundamental mode of the optical fiber.

BACKGROUND

In application areas such as metropolitan area networks, local area networks, fiber-to-the-home networks, and medium- and short-haul communications, to facilitate laying or reducing the occupied space, an optical fiber cable often needs operate at a small bending radius. However, a conventional single-mode fiber cannot meet the requirement of operation at a small bending radius. To meet the requirement of the low bending loss of the optical fiber, the international G.657 standard is proposed for the optical fiber. The low bending loss of the optical fiber is usually implemented by way of reducing the size of the core of the optical fiber, introducing a cladding structure having grooves, or using an aperture-assisted optical fiber (K. Himeno, S. Matsuo, N. Guan, and A. Wada, "Low-Bending-Loss Single-Mode Fibers for Fiber-to-the-Home," Journal of Lightwave Technology, 2005, 23(11): 3494-3499).

Although a G.657 optical fiber can operate at a bending radius of 7.5 mm or even 5 mm, the bending loss of the optical fiber is still large, so it is difficult for the G.657 optical fiber to stably operate at a small bending radius for a long time. For example, the G.657B3 optical fiber should have a bending loss less than 0.08 dB/turn at a bending radius of 7.5 mm and 0.15 dB/turn at a bending radius of 5 mm (1550 nm wavelength). Apparently, after being wound for several coils at this small bending radius, the optical fiber still has a large loss that impacts the performance of the communication system.

According to the optical fiber theory, for a step index optical fiber, when the normalized frequency is less than 2.405 at the operating wavelength, the optical fiber is a single-mode optical fiber; when the normalized frequency is greater than 2.405, the optical fiber can transmit a high-order mode and thus serves as a non-single-mode optical fiber. A conventional multi-mode or few-mode optical fiber has a high-order mode that causes serious intermodal dispersion in transmission of signal light through the optical fiber, limiting the communication rate and capacity of the optical fiber. Thus, single-mode optical fibers still serve as main transmission media in an optical fiber communication system at present.

If a non-single-mode optical fiber is used in the optical fiber communication system, the difference between the refractive index of the core and the refractive index of the cladding of the optical fiber is effectively increased, so that transmission with a low bending loss can be achieved; and the non-single-mode optical fiber is matched with and connected to a single-mode optical fiber, so that single-mode transmission can be achieved (Chinese patent No. 201010589018.1 entitled "OPTICAL FIBER COMMUNICATION SYSTEM" and Chinese patent No. ZL201210393511.5 entitled "COMMUNICATION SYSTEM BASED ON FEW-MODE OPTICAL FIBER"). This technology reduces limits on the number of optical fiber transmission modes and implements connection to the single-mode optical fiber to suppress the generation of high-order modes, thereby meeting the requirements of low bending loss, single-mode transmission and low connection loss. However, this method requires that the few-mode optical fiber be connected to single-mode fibers at both ends with small connection deviation. This limits the practical use of the few-mode optical fiber.

Therefore, it is required to provide an optical fiber capable of single-mode transmission and, after being wound for several coils at a small bending radius, capable of low-loss transmission.

SUMMARY

The present disclosure provides a few-mode optical fiber capable of single-mode transmission and capable of low-loss transmission at a small bending radius.

A few-mode optical fiber includes: a core and a cladding surrounding the core. The cladding includes: a first inner cladding surrounding the core; a first high-refractive-index mode filter layer surrounding the first inner cladding; a second inner cladding surrounding the first high-refractive-index mode filter layer; a second high-refractive-index mode filter layer surrounding the second inner cladding; and an outer cladding surrounding the second high-refractive-index mode filter layer.

The core, the first inner cladding, the first high-refractive-index mode filter layer, the second inner cladding, the second high-refractive-index mode filter layer and the outer cladding have refractive indexes of n1, n2, n3, n4, n5 and n6 respectively, which satisfy: n1>n3>n5>n6 and n2=n4=n6. The core and the first inner cladding satisfy: 2.405<V<4.4, where $$V = \frac{2\pi a_1}{\lambda_0}(n_1^2 - n_2^2)^{1/2},$$

V denotes a normalized frequency, $\lambda_0=1625$ nm, and a1 denotes a radius of the core. The refractive index n3 and a radial thickness a3 of the first high-refractive-index mode filter layer satisfy: 1.7<F<3.3 and V>F, where $$F = \frac{2\pi a_3}{\lambda_0}(n_3^2 - n_6^2)^{1/2}.$$

The first inner cladding, the first high-refractive-index mode filter layer, the second inner cladding and the second high-refractive-index mode filter layer have radial thickness of a2, a3, a4 and a5 respectively.

In an embodiment, in the above optical fiber, an effective refractive index of an LP11 mode of the optical fiber is greater than an effective refractive index of a cladding defect mode of the optical fiber in a wavelength range of 1260 to 1625 nm.

In an embodiment, in the above optical fiber, the refractive index of the first high-refractive-index mode filter layer and the refractive index of the second high-refractive-index mode filter layer satisfy: n3−n5>(a5/2+a4+a3/2)/Rb, where Rb=7.5 mm.

In an embodiment, in the above optical fiber, the radial thickness a3 of the first high-refractive-index mode filter layer and the radial thickness a5 of the second high-refractive-index mode filter layer satisfy: a3≥a5.

In an embodiment, in the above optical fiber, the refractive index n1 of the core and the refractive index n6 of the outer cladding satisfy: 0.015>n1−n6>0.007.

In an embodiment, in the above optical fiber, the radial thickness a2 of the first inner cladding satisfies: 7.9 μm≥a2≥4.0 μm.

In an embodiment, in the above optical fiber, the radial thickness a3 of the first high-refractive-index mode filter layer satisfies: 8.5 μm≥a3≥3.5 μm.

In an embodiment, in the above optical fiber, the radial thickness a4 of the second inner cladding satisfies: 4.6 μm≥a4≥2.4 μm.

In an embodiment, in the above optical fiber, the radial thickness a5 of the second high-refractive-index mode filter layer satisfies: 8.5 μm≥a5≥3.5 μm.

At a wavelength of 1550 nm, the optical fiber has a bending loss satisfying: when a bending radius Rb≥7.5 mm, a bending loss of in LP01 mode is less than $1\times10^{-3}$ dB/turn; and when the bending radius Rb≤7.5 mm, a bending loss of in LP11 mode is greater than 5 dB/turn.

The cut-off wavelength of the optical fiber is greater than 1.625 μm.

The present disclosure provides a few-mode optical fiber having a bending radius greater than 7.5 mm and a low bending loss ($<1\times10^{-3}$ dB/turn). In the conventional optical communication waveband (a wavelength range of 1260 nm to 1625 nm), the optical fiber of the present disclosure is a non-single-mode optical fiber in a straight waveguide state, and the optical fiber is bent to a sufficiently small bending radius so that the high-order mode of the core of the optical fiber is strongly coupled to the mode of the high-refractive-index mode filter layer of the optical fiber. In this way, the high-order mode can be filtered out and the purpose of equivalent single-mode transmission can be achieved. A large difference can exist between the refractive index of the core and the refractive index of the cladding to ensure an ultra-low bending loss in transmission of the optical fiber in fundamental mode. This make the optical fiber have a low bending loss after the optical fiber is wound for several coils at a small bending radius, enables single-mode transmission like the single-mode optical fiber, and implements connection to the single-mode optical fiber by way of soldering or movable connection. The optical fiber of the present disclosure can achieve single-mode transmission just after bent appropriately and is applicable to scenarios where compact optical fiber devices and optical fiber components are needed in various short-haul communication systems. The structure of the optical fiber of the present disclosure has circular symmetry and can be implemented using the existing mature optical fiber fabrication process. In this structure, only the core and the two high-refractive-index mode filter layers need to be doped, and other areas and the outer cladding have the same refractive index. This simplifies the preparation process of the optical fiber and effectively reduces the manufacturing cost of the optical fiber.

DETAILED DESCRIPTION

Figure 1:
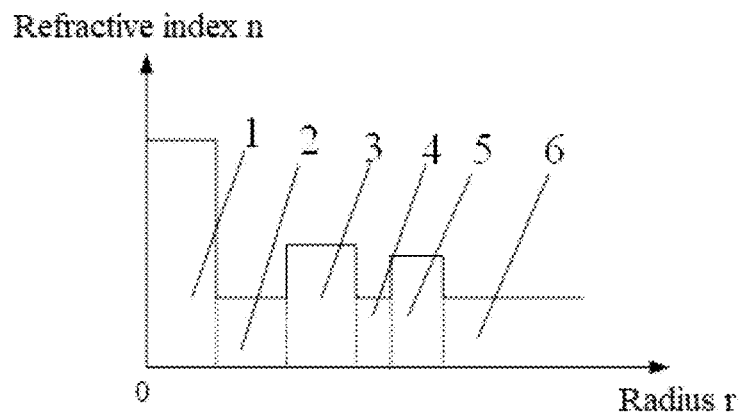
FIG. 1 illustrates a radial refractive index profile of an optical fiber according to an embodiment of the present application; where 1—core, 2—first inner cladding, 3—first high-refractive-index mode filter layer, 4—second inner cladding, 5—second high-refractive-index mode filter layer, 6—outer cladding.

In embodiments of the present application, on the basis of a few-mode core having an ultra-low bending loss, an optical fiber is designed to have a defect mode with a high leakage loss in the bent state. In this way, on the one hand, a high-order mode of the optical fiber is leaked after strongly coupled to a cladding defect mode; on the other hand, a low bending loss is maintained in transmission of a fundamental mode of the optical fiber.

It can be seen from the bending theory of the optical fiber that when the optical fiber is bent, the structure of the optical fiber may still be equivalent to a straight waveguide, that is, the refractive index distribution of the equivalent straight waveguide may be expressed as:

$$n(x, y) = n_0(x, y)\left(1 + (1 + \chi)\frac{x}{R_b}\right),$$

where $n_0(x,y)$ denotes the cross-sectional refractive index distribution of the optical fiber when the optical fiber is not bent, $n(x,y)$ denotes the refractive index distribution of the equivalent straight waveguide, x denotes the elasto-optical coefficient of the material, and Rb denotes the bending radius of the optical fiber. Here it is assumed that the optical fiber is bent in the positive direction of the x-axis. It can be seen from the formula that after the fiber is bent, the farther away from the center of the core, the smaller the bending radius, the greater the refractive index change. Since light is usually concentrated in a high-refractive-index area, the mode energy in the core will be concentrated toward the side where the refractive index is increased, that is, the mode effective refractive index generally increases as the bending radius increases. Meanwhile, on the side where the refractive index of the core increases, the refractive index of the outer cladding also increases with the bending, eventually causing the cladding defect mode to fail to satisfy the total internal reflection condition and leak.

Here, in the case where the core is sufficiently large, a large difference exists between the refractive index of the core and the refractive index of the inner cladding adjacent to the core, that is, the normalized frequency is sufficiently large. This ensures that the fundamental mode of the optical fiber has an ultra-low bending loss. In this case, the effective refractive index of the high-order mode is also large. For this reason, the effective refractive index of the cladding defect mode is also required to be large, thereby facilitating the coupling between the high-order mode and the cladding defect mode in the bent state. A larger mode effective refractive index indicates a lower loss of the cladding defect mode in the bent state, which is disadvantageous for the loss of the high-order mode. Thus, it is proposed to implement dual high-refractive-index mode filter layers, in which a high-refractive-index mode filter layer closer to the core has a larger refractive index and is advantageous for the coupling between the defect mode and the high-order mode, and a high-refractive-index mode filter layer farther from the core has a lower refractive index and is advantageous for the large loss of the defect mode in the bent state. Meanwhile, in the bent state, the refractive index has a larger change in the area farther from the core, so the defect modes in the respective two high-refractive-index mode filter layers still have similar effective refractive indexes in an appropriate bent state, thereby ensuring strong coupling between the defect modes and finally causing the high-order mode to leak after passing through the two high-refractive-index mode filter layers.

A conventional single-mode optical fiber performs single-mode transmission at the operating wavelength, that is, the cut-off wavelength of the conventional single-mode optical fiber is less than the operating wavelength of the conventional single-mode optical fiber. The cut-off wavelength of the optical fiber of embodiments of the present disclosure is greater than the operating wavelength of the optical fiber. Therefore, in the straight fiber state, the optical fiber supports transmission of a high-order mode and, in the bent state, a large bending loss of the high-order mode of the optical fiber occurs, causing effective transmission to fail. In this way, effective single mode transmission can be implemented.

The refractive index of the core needs to be high enough to achieve an ultra-low bending loss in transmission of the fundamental mode. Meanwhile, an excess of modes that impact the transmission performance of the optical fiber is avoided. Thus, it is required that the core and the first inner cladding satisfy: 2.405<V<4.4. Here $$V = \frac{2\pi a_1}{\lambda_0}(n_1^2 - n_2^2)^{1/2},$$

V denotes the normalized frequency, and $\lambda_0$=1625 nm. That is, the core of the optical fiber supports transmission of the high-order mode at a wavelength of 1625 nm or shorter.

The first high-refractive-index mode filter layer should have enough defect modes to ensure effective coupling with the high-order mode. Meanwhile, the ability of constraining light cannot be too strong, thereby facilitating the leakage of energy in the bent state. The refractive index n3 and the radial thickness a3 of the first high-refractive-index mode filter layer satisfy: 1.7<F<3.3 and V>F. Here, $$F = \frac{2\pi a_3}{\lambda_0}(n_3^2 - n_6^2)^{1/2}$$

and $\lambda_0$=1625 nm.

The effective refractive index of the cladding defect mode should be lower than that of the high-order mode. This is because the effective refractive index of the defect mode increases greatly after the optical fiber is bent, making it easy for the defect mode and the high-order mode to have similar effective refractive indexes (that is, mode matching). Moreover, the low effective refractive index of the cladding defect mode ensures a large difference between the effective refractive index of the cladding defect mode and the effective refractive index of the fundamental mode of the optical fiber in both the straight fiber state and the bent state, thereby leading to a small impact on the loss of the fundamental mode of the optical fiber and ensuring a low bending loss in transmission of the fundamental mode of the optical fiber.

To ensure a low bending loss in transmission of the core fundamental mode, the difference between the refractive index of the core and the refractive index of the cladding is large, that is, the high-order mode also has a large effective refractive index. Thus, the first high-refractive-index mode filter layer and the second high-refractive-index mode filter layer must also have high refractive indexes so that the defect mode matches the fundamental mode of the core. The greater the refractive indexes of the first high-refractive-index mode filter layer and the second high-refractive-index mode filter layer are, the smaller the bending loss is. To increase the bending loss of the defect mode, it is required here that the refractive index of the first high-refractive-index mode filter layer be higher than the refractive index of the second high-refractive-index mode filter layer. On the one hand, the defect mode of the first high-refractive-index mode filter layer has a higher effective refractive index and thus is easy to couple to the high-order mode of the core; on the other hand, the second high-refractive-index mode filter layer has a lower effective refractive index and thus is easy to leak. Meanwhile, the second high-refractive-index mode filter layer is farther from the core and thus has a larger change in refractive index as the optical fiber is bent. Therefore, in the bent state, the refractive index of the second high-refractive-index mode filter layer is similar to that of the first high-refractive-index mode filter layer, ensuring strong coupling between modes of the two mode filter layers. That is, in the bent state, the first high-refractive-index mode filter layer functions to couple the high-order mode of the core to the cladding, and the second high-refractive-index mode filter layer functions to increase the bending loss of the defect mode. In the bent state, in the direction where the refractive index increases, the refractive index of the first high-refractive-index mode filter layer should still be greater than that of the second high-refractive-index mode filter layer. Thus it is required that the refractive index of the first high-refractive-index mode filter layer and the refractive index of the second high-refractive-index mode filter layer satisfy: n3−n5>(a5/2+a4+a3/2)/Rb, where Rb=7.5 mm.

The principles and features of the optical fiber of embodiments of the present disclosure will be further described below with reference to the accompanying drawings.

Figure 2A:
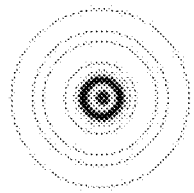
FIG. 2A illustrates a mode field profile of an LP01 mode of an optical fiber at a bending radius of 7.5 mm according to an embodiment of the present application.
Figure 2B:
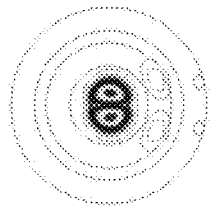
FIG. 2B illustrates a mode field profile of an LP11 mode of the optical fiber at the bending radius of 7.5 mm according to an embodiment of the present application.
Figure 2C:
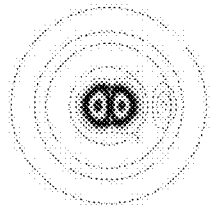
FIG. 2C illustrates a mode field profile of another LP11 mode of the optical fiber at the bending radius of 7.5 mm according to an embodiment of the present application.
Figure 3:
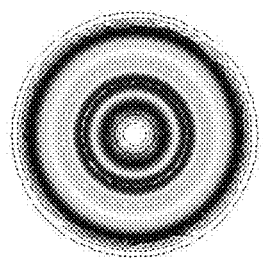
FIG. 3 illustrates a mode field profile of a cladding defect mode according to embodiments of the present application.
Figure 4A:
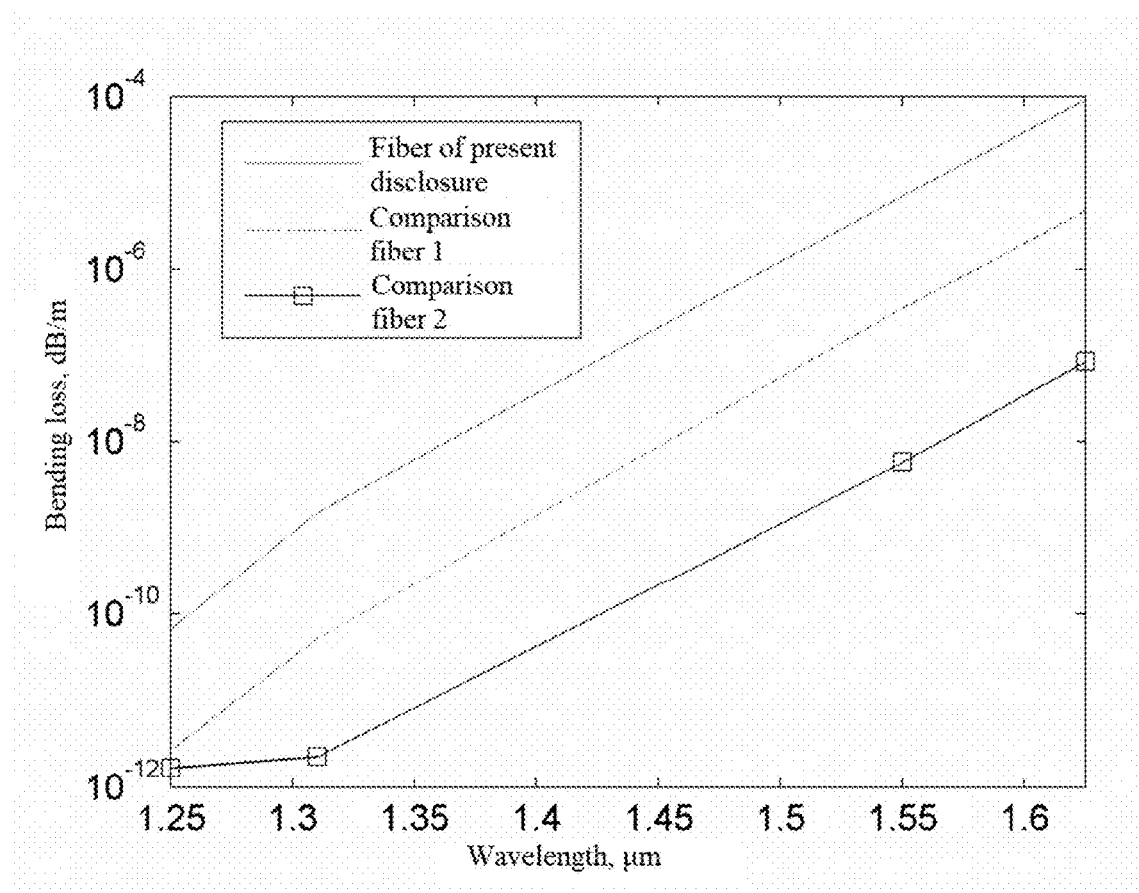
FIG. 4A is a graph showing a relationship between bending losses of LP01 modes of an optical fiber of an embodiment of the present application, a comparison optical fiber 1 and a comparison optical fiber 2 and different operating wavelengths.
Figure 4B:
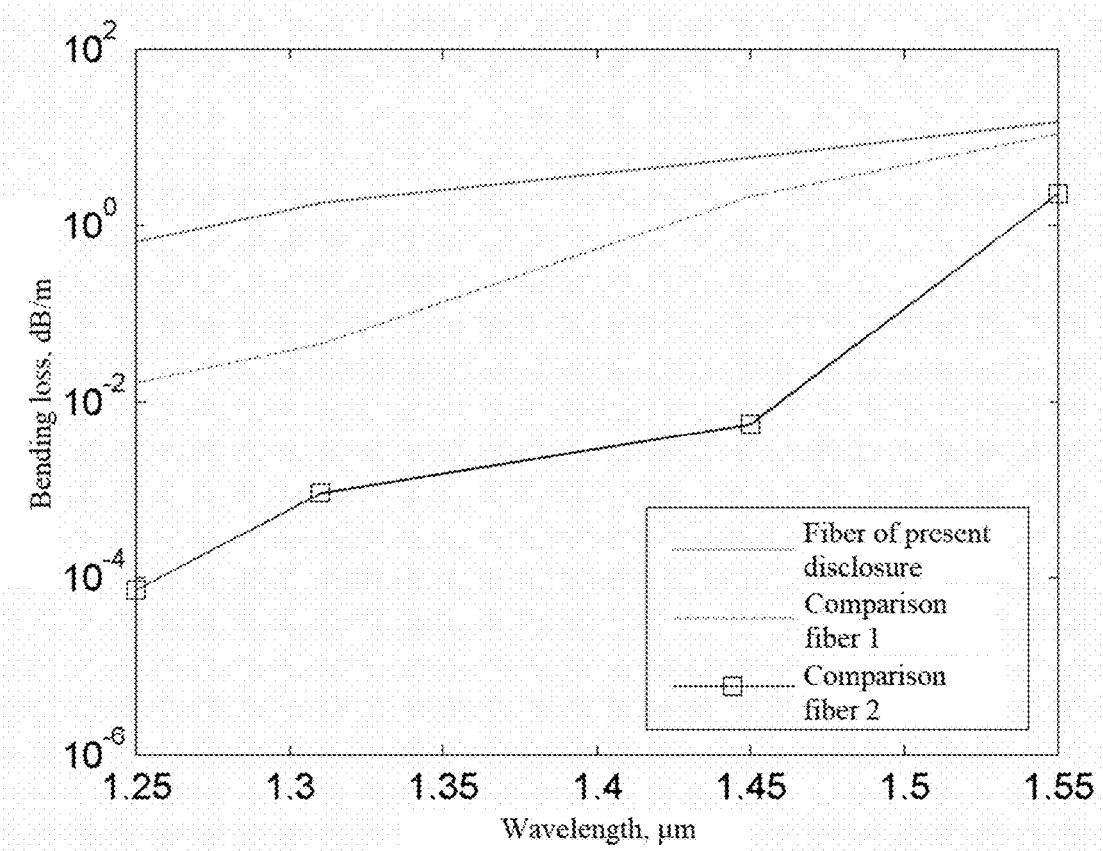
FIG. 4B is a graph showing a relationship between bending losses of LP11 modes of the optical fiber of an embodiment of the present application, the comparison optical fiber 1 and the comparison optical fiber 2 and different operating wavelengths.

The optical fiber includes a core, a first inner cladding, a first high-refractive-index mode filter layer, a second inner cladding, a second high-refractive-index mode filter layer and an outer cladding. FIG. 1 illustrates a radial refractive index profile of an optical fiber according to an embodiment of the present application, where 1—core, 2—first inner cladding, 3—first high-refractive-index mode filter layer, 4—second inner cladding, 5—second high-refractive-index mode filter layer, 6—outer cladding. FIG. 2 shows mode field profiles of fundamental modes (that is, LP01 mode and LP11 mode) of an optical fiber at a bending radius of 7.5 mm according to embodiments of the present application. FIG. 2A illustrates a mode field profile of an LP01 mode of the optical fiber at the bending radius of 7.5 mm according to an embodiment of the present application. FIG. 2B illustrates a mode field profile of an LP11 mode of the optical fiber at the bending radius of 7.5 mm according to an embodiment of the present application. FIG. 2C illustrates a mode field profile of another LP11 mode of the optical fiber at the bending radius of 7.5 mm according to an embodiment of the present application. As can be seen from the figures, the LP01 modes are still concentrated in the central area of the core, and the LP11 mode is significantly coupled to the defect mode in the first high-refractive-index mode filter layer. FIG. 3 illustrates a mode field profile of a cladding defect mode according to embodiments of the present application. As can be seen from the figures, the cladding defect modes are concentrated mainly in the first high-refractive-index mode filter layer, the second inner cladding and the second high-refractive-index mode filter layer. To reveal the function of high-refractive-index mode filter layers, comparison is made among curves representing bending losses of LP11 modes of the optical fiber of the present embodiment, a comparison optical fiber 1 (equivalent to the optical fiber of the present embodiment when a5=0, that is, no second high-refractive-index mode filter layer exists) and a comparison optical fiber 2 (equivalent to the optical fiber of the present embodiment when a3=0 and a5=0, that is, a step index optical fiber). As can be seen from FIG. 4, FIG. 4A is a graph showing a relationship between bending losses of LP01 modes of the optical fiber of an embodiment of the present application, the comparison optical fiber 1 and the comparison optical fiber 2 and different operating wavelengths and FIG. 4B is a graph showing a relationship between bending losses of LP11 modes of the optical fiber of an embodiment of the present application, the comparison optical fiber 1 and the comparison optical fiber 2 and different operating wavelengths. The bending loss of the LP01 mode of the optical fiber of the embodiment is the largest but is less than $1 \times 10^{-4}$ dB/turn in the illustrated wavelength range, ensuring a low bending loss in transmission of the fundamental mode of the optical fiber. When the wavelength of the optical fiber exceeds 1.3 μm, the bending loss of the LP11 mode of the optical fiber exceeds 2 dB/turn, ensuring that the LP11 mode is filtered out after the optical fiber is bent; on the contrary the bending losses of both the comparison optical fiber 1 and the comparison optical fiber 2 are much lower, making it difficult to filter out the high-order mode. Therefore, the structure of dual high-refractive-index mode filter layers of embodiments of the present application can effectively increase the bending loss of the LP11 mode, thereby achieving equivalent single-mode transmission in a wide wavelength range.

Embodiment

The optical fiber includes a core, a first inner cladding, a first high-refractive-index mode filter layer, a second inner cladding, a second high-refractive-index mode filter layer and an outer cladding. The radius a1 of the core is 5 μm. The difference between the refractive index of the core and the refractive index of the first inner cladding is: n1−n2=0.01. The radial thickness of the first high-refractive-index mode filter layer is 6 μm. The difference between the refractive index of the first high-refractive-index mode filter layer and the refractive index of the outer cladding is: n3−n6=0.005. The radial thickness of the second high-refractive-index mode filter layer is 6 μm. The difference between the refractive index of the second high-refractive-index mode filter layer and the refractive index of the outer cladding is: n5−n6=0.003. When the bending radius of the optical fiber is 7.5 mm, the bending loss of the LP01 mode is less than $1 \times 10^{-4}$ dB/turn in a wavelength range of 1.26 to 1.625 μm; the bending loss of the LP11 mode is greater than 2 dB/turn, ensuring that the LP11 mode is filtered out effectively; and the diameter of the mode field is 8.8 μm at a wavelength of 1.31 μm.

The above optical fiber may be implemented using the same manufacturing process as common single-mode optical fibers.

INDUSTRIAL APPLICABILITY

The present disclosure provides a few-mode optical fiber having a bending radius greater than 7.5 mm and a low bending loss ($<1 \times 10^{-3}$ dB/turn). In the conventional optical communication waveband (a wavelength of 1260 nm to 1625 nm), the optical fiber of the present disclosure is a non-single-mode optical fiber in a straight waveguide state, and the optical fiber is bent at a sufficiently small bending radius so that the high-order mode of the core of the optical fiber is strongly coupled to the mode of the high-refractive-index mode filter layer of the optical fiber. In this way, the high-order mode can be filtered out and the purpose of equivalent single-mode transmission can be achieved

What is claimed is:
1. A few-mode optical fiber, comprising:
a core; and
a cladding surrounding the core,
wherein the cladding comprises:
a first inner cladding surrounding the core;
a first high-refractive-index mode filter layer surrounding the first inner cladding;
a second inner cladding surrounding the first high-refractive-index mode filter layer;
a second high-refractive-index mode filter layer surrounding the second inner cladding; and
an outer cladding surrounding the second high-refractive-index mode filter layer,
wherein the core has a refractive index of n1, the first inner cladding has a refractive index of n2, the first high-refractive-index mode filter layer has a refractive index of n3, the second inner cladding has a refractive index of n4, the second high-refractive-index mode filter layer has a refractive index of n5, the outer cladding has a refractive index of n6, satisfying: n1>n3>n5>n6 and n2=n4=n6; the core and the first inner cladding satisfy: 2.405<V<4.4, wherein

$$V = \frac{2\pi a_1}{\lambda_0} (n_1^2 - n_2^2)^{1/2},$$

V denotes a normalized frequency, $\lambda_0$=1625 nm, and a1 denotes a radius of the core; the refractive index n3 and a radial thickness a3 of the first high-refractive-index mode filter layer satisfy: 1.7<F<3.3 and V>F, wherein $$F = \frac{2\pi a_3}{\lambda_0} (n_3^2 - n_6^2)^{1/2};$$

and the first inner cladding has a radial thickness of a2, the first high-refractive-index mode filter layer has the radial thickness of a3, the second inner cladding has a radial thickness of a4, the second high-refractive-index mode filter layer has a radial thickness of a5.

2. The few-mode optical fiber of claim 1, wherein an effective refractive index of an LP11 mode of the optical fiber is greater than an effective refractive index of a cladding defect mode of the optical fiber in a wavelength range of 1260 to 1625 nm.

3. The few-mode optical fiber of claim 1, wherein the refractive index of the first high-refractive-index mode filter layer and the refractive index of the second high-refractive-index mode filter layer satisfy: n3−n5>(a5/2+a4+a3/2)/Rb, wherein Rb=7.5 mm.

4. The few-mode optical fiber of claim 1, wherein the radial thickness a3 of the first high-refractive-index mode filter layer and the radial thickness a5 of the second high-refractive-index mode filter layer satisfy: a3≥a5.

5. The few-mode optical fiber of claim 1, wherein the refractive index n1 of the core and the refractive index n6 of the outer cladding satisfy: 0.015>n1−n6>0.007.

6. The few-mode optical fiber of claim 1, wherein the radial thickness a2 of the first inner cladding satisfies: 7.9 μm≥a2≥4.0 μm.

7. The few-mode optical fiber of claim 1, wherein the radial thickness a3 of the first high-refractive-index mode filter layer satisfies: 8.5 μm≥a3≥3.5 μm.

8. The few-mode optical fiber of claim 1, wherein the radial thickness a4 of the second inner cladding satisfies: 4.6 μm≥a4≥2.4 μm.

9. The few-mode optical fiber of claim 1, wherein the radial thickness a5 of the second high-refractive-index mode filter layer satisfies: 8.5 μm≥a5≥3.5 μm.

10. The few-mode optical fiber of claim 1, wherein at a wavelength of 1550 nm, the optical fiber has a bending loss satisfying:

when a bending radius Rb≥7.5 mm, a bending loss in an LP01 mode is less than $1\times10^{-3}$ dB/turn; and when the bending radius Rb≤7.5 mm, a bending loss in an LP11 mode is greater than 5 dB/turn.

* * * * *